(12) United States Patent
Bostick et al.

(10) Patent No.: US 10,672,042 B2
(45) Date of Patent: Jun. 2, 2020

(54) METHOD FOR TAILORED MOBILE APPLICATION RATING INSIGHTS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 14/990,866

(22) Filed: Jan. 8, 2016

(65) Prior Publication Data

US 2017/0200204 A1 Jul. 13, 2017

(51) Int. Cl.
*G06Q 30/00* (2012.01)
*G06Q 30/02* (2012.01)
*H04W 4/18* (2009.01)
*G06Q 30/06* (2012.01)

(52) U.S. Cl.
CPC ..... *G06Q 30/0282* (2013.01); *G06Q 30/0631* (2013.01); *G06Q 30/0641* (2013.01); *H04W 4/18* (2013.01)

(58) Field of Classification Search
CPC ........... G06Q 30/0282; G06Q 30/0631; G06Q 30/0641; H04W 4/18
USPC ..................................................... 705/26, 27
See application file for complete search history.

(56) References Cited

U.S. PATENT DOCUMENTS

| 8,838,633 | B2 | 9/2014 | Dhillon | |
|---|---|---|---|---|
| 10,324,985 | B2* | 6/2019 | Delli Santi | ............ G06Q 30/00 |
| 2005/0148329 | A1* | 7/2005 | Brunet | .................. H04W 8/245 |
| | | | | 455/432.2 |
| 2010/0262619 | A1* | 10/2010 | Zargahi | ..................... G06F 8/61 |
| | | | | 707/770 |

(Continued)

FOREIGN PATENT DOCUMENTS

WO 2013184383 12/2013

OTHER PUBLICATIONS

CrowdChunk LLC; "CrowdChunk System, Method and Computer Program Product for Searching Summaries of Mobile Apps Reviews," Journal of Robotics & Machine Learning [Atlanta] Jul. 21, 2014: 1139; Dialog #1545225511 6pgs . . . (Year: 2014).*

(Continued)

*Primary Examiner* — Robert M Pond
(74) *Attorney, Agent, or Firm* — Maeve M. Carpenter

(57) ABSTRACT

A system and method for customizing mobile device application reviews that collects attributes of the mobile device of the reviewing user along with the actual review. When a potential user accesses the reviews, corresponding information is collected from the mobile device of the potential user and then used to filter the reviews for the target application. The attributes can include mobile device type, mobile device operating system, location, mobile device service provider, mobile device storage capacity remaining, mobile device signal strength, and type of mobile connection. The filtering of reviews can be managed manually by the potential user or automatically by using intelligent analysis of the attributes and the content of the reviews in order to provide enhanced insight to the potential user.

13 Claims, 6 Drawing Sheets

(56) References Cited

U.S. PATENT DOCUMENTS

| | | | |
|---|---|---|---|
| 2011/0307354 A1* | 12/2011 | Erman | G06F 8/60 |
| | | | 705/27.1 |
| 2012/0072283 A1 | 3/2012 | DeVore | |
| 2012/0317266 A1 | 12/2012 | Abbott | |
| 2013/0091441 A1 | 4/2013 | Pattan | |
| 2013/0339345 A1 | 12/2013 | Soto Matamala | |
| 2014/0081805 A1* | 3/2014 | Nikolic | G06Q 30/0282 |
| | | | 705/26.61 |
| 2014/0172638 A1* | 6/2014 | El-Hmayssi | G06Q 30/0613 |
| | | | 705/26.41 |
| 2016/0179955 A1* | 6/2016 | Delli Santi | G06F 17/30864 |
| | | | 707/709 |
| 2017/0091847 A1 | 3/2017 | Cama et al. | |

OTHER PUBLICATIONS

Williamson, L., Add IBM Mobile Quality Assurance to your Mobile Quality Regime; www.ibm.com; Mar. 4, 2014; http://www.ibm.com/developerworks/library/mo-mqa/.

Kimura, H., Breakdown of Reviews Gives iOS and Android App Publishers a Powerful Review Mining Alternative; Sensor Tower Blog; Dec. 18, 2014.

\* cited by examiner

INSIGHT: 70% OF REVIEWERS IN YOUR LOCATION AND WITH XYZ WERE UNHAPPY WITH THE SPEED OF THE APPLICATION ( MORE INFO )

INSIGHT: 85% OF REVIEWERS WITH A SIMILAR AMOUNT OF FREE STORAGE RATED THE APP 3 STARS OR LESS DUE TO THE LARGE SIZE OF THE APP ( MORE INFO )

FIG. 4

METHOD FOR TAILORED MOBILE APPLICATION RATING INSIGHTS

BACKGROUND

The present invention relates to mobile application selection and, more specifically, to a method that presents users of mobile devices with application ratings and reviews that most closely apply to their own set of circumstances.

With over 1.2 million iOS™ apps and 1.3 million Android® applications to choose from, finding the right application is a challenge for every mobile device user. Many users rely on application reviews to evaluate if an application is right for them. Application reviews are submitted by other mobile device users who have downloaded the application onto their own mobile device. The review typically consists of two parts: a star rating (typically 1 through 5 stars) and, optionally, a written description of the experience of the user with the application. The application reviews are made available to potential uses in an application store.

There are many criteria that define the suitability of an application for a given user. One user may rate an application poorly (a 1 star rating) if, for example, it performs slowly on their device. Another user, with a newer device, may not experience these problems and rate the application highly (5 stars). Similarly, a skiing application may receive contrasting ratings based on geography—a user in Colorado may love it (it does, after all, feature their favorite resort of Breckenridge) while a user in North Carolina may be disappointed (their local resort, Sugar Mountain, is nowhere to be found). Clearly there are many factors influencing application ratings, and application stores provide very little customization to cut out the noise and present a user with reviews and ratings of applications that apply to their specific situation. For example, the Google Play™ application store allows users to filter reviews based on application version (latest or all) and to order the reviews according to three criteria: newest, rating, and helpful. the Google Play™ application store also offers an additional filter for mobile devices—By Device—which shows only reviews that were received by those using the specific device of the user. These limited filtering and sorting capabilities leave users with potentially hundreds of reviews to scan through, many of which do not apply to their situation. Users in a different city, or running a different OS version, or on a different network carrier, or with differing storage capacities may all have different impressions of how an application meets their needs. Thus, there is a need in the art for a system and method of presenting potential users of mobile devices with applications ratings and reviews that most closely apply to their own specific set of circumstances.

SUMMARY

The present invention comprises a system that is enabled to capture a first set of specific characteristics about a mobile device when a reviewer uploads a mobile device application review through the mobile device, and then filter mobile device application reviews based on the captured first set of specific characteristics when a potential user of the application requests reviews for a given application. In various embodiments, the captured set of specific characteristics of the mobile device can comprise the manufacturer of the mobile device, the OS level in which the mobile device operates, the geographical location in which the mobile device application review was uploaded, the wireless service provider of the mobile device, the connection type at the time when the mobile device application review was uploaded, the connection strength at the time when the mobile device application review was uploaded, and the available storage of the mobile device at the time when the mobile device application review was uploaded. In one embodiment, the system receives a mobile device application selection from a mobile application catalogue/store from a user looking to download a mobile device application, and displays the filtered plurality of mobile device application reviews about the selected mobile device application, wherein the filtering is based on finding similarities between the captured first set of specific characteristics associated with the mobile device application review and a second set of specific characteristics about a second mobile device owned by the user. In another embodiment, the system identifies rating, sentiment, and semantic patterns within the content of amongst the filtered plurality of mobile device application reviews, and provides insight about the mobile device application that is tailored to the potential user based on the analysis of the identified rating, sentiment, and semantic patterns.

BRIEF DESCRIPTION OF THE DRAWINGS

The present invention will be more fully understood and appreciated by reading the following Detailed Description in conjunction with the accompanying drawings, in which:

FIG. 4 is a schematic of insights provided according to an embodiment of the present invention;

DETAILED DESCRIPTION

Figure 1:
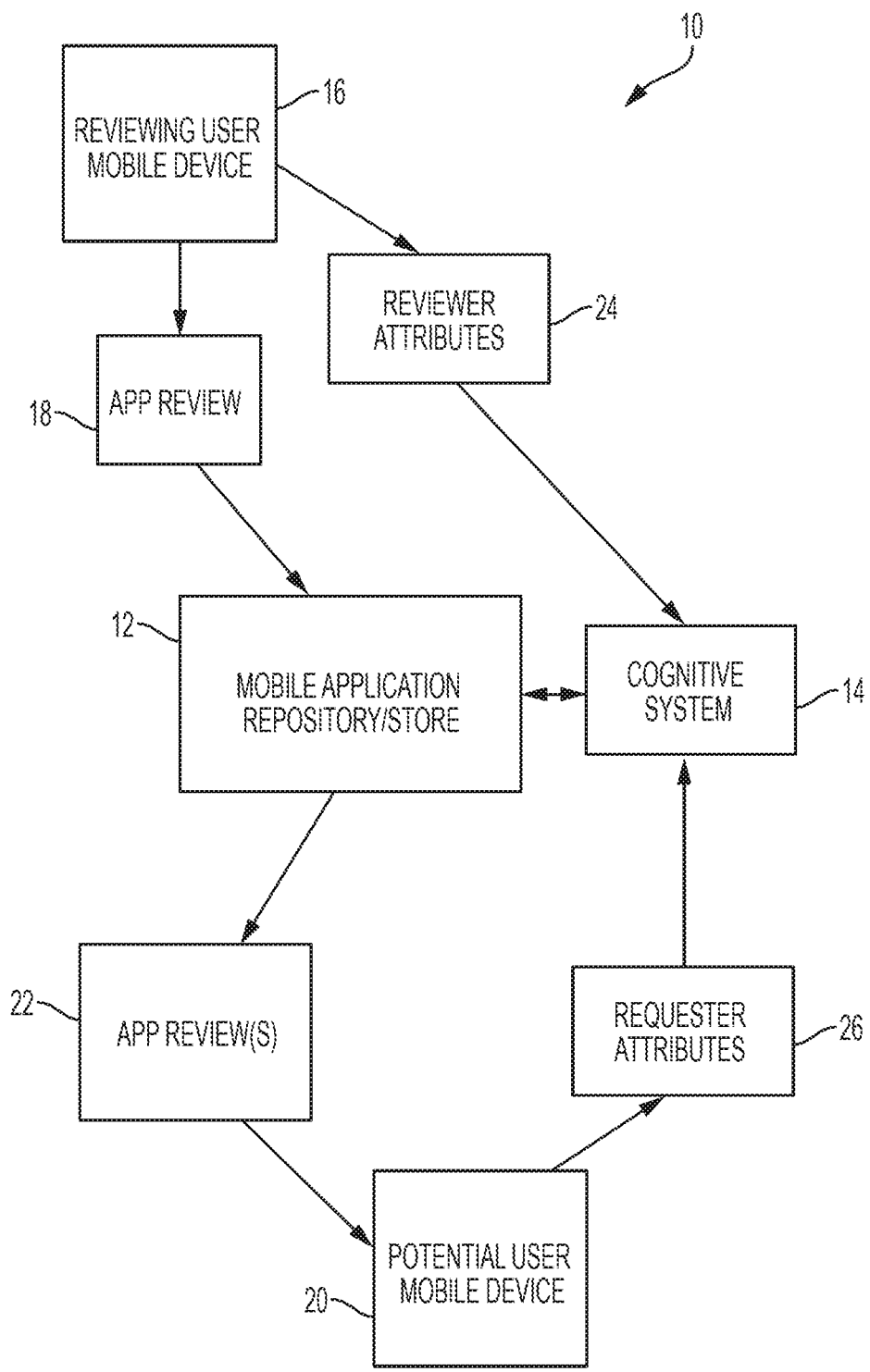
FIG. 1 is a schematic of a system for tailored mobile application rating insights according to the present invention.

Referring now to the drawings, wherein like reference numerals refer to like parts throughout, there is seen in FIG. 1 a system 10 for presenting potential users of mobile devices with applications ratings and reviews that most closely apply to their own specific set of circumstances. System 10 comprises a mobile application repository/store 12 and a cognitive system 14, such as a server, interconnected to application store 12. Application store 12 includes a component that is configured to capture ratings and reviews of apps, and that is extended to include new attributes as described herein with respect to the present invention. Application store 12 also includes a component for searching reviews based on the criteria of the present invention. Cognitive system 14 is preferably implemented as a remote server or as an extension of existing application repositories. Cognitive system 14 includes software used for processing and analysis of shared attributes to develop insights according to the present invention. Finally, system 10 comprises a mobile device 16 that includes a component for a reviewing user to view application ratings based on shared attributes, a component for a user to search application ratings combining multiple shared attributes, and a component for a user to view insights derived from comparative analysis of shared attributes. In practice, a mobile device 16 is initially used by a user of a particular application to submit an app review 18 about the application, and a mobile device 20 is used by a potential user of the application to assess a plurality of previously collected app reviews 22 for the application prior to purchasing or downloading the application.

In addition to app review 18, metadata comprising reviewer attributes 24 of mobile device 16 is collected by system 10 when a user of an application submits an application rating and review to an application store. Conventionally, the user provides a star rating (typically 1-5 stars) of the application and a written review of the application. Some identifying information may also be retrieved from the device of the user and sent to the application store, such as the version of the application being rated, the type of mobile device sending the review, and the name of the user of the device. The present invention further requires that mobile device 16 provide the mobile device OS level, current geolocation, cellular provider, current connection type (WiFi, 4G LTE, etc.), current connection signal strength, and the amount of available storage on the device. In one embodiment, this additional information is provided by the mobile device in response to a request from the application store. In another embodiment, this information is collected and provided by application residing on the mobile device.

Next, when a potential user of the application navigates to the application in the application store and requests reviews for a particular application, the same information is collected from the mobile device of the potential user. More specifically, requester attributes 26 can comprise the mobile device OS level, current geolocation, cellular provider, current connection type (WiFi, 4G LTE, etc.), current connection signal strength, and the amount of available storage on the device is collected and provided to application store from the mobile device of the potential user as described above.

Figure 2:
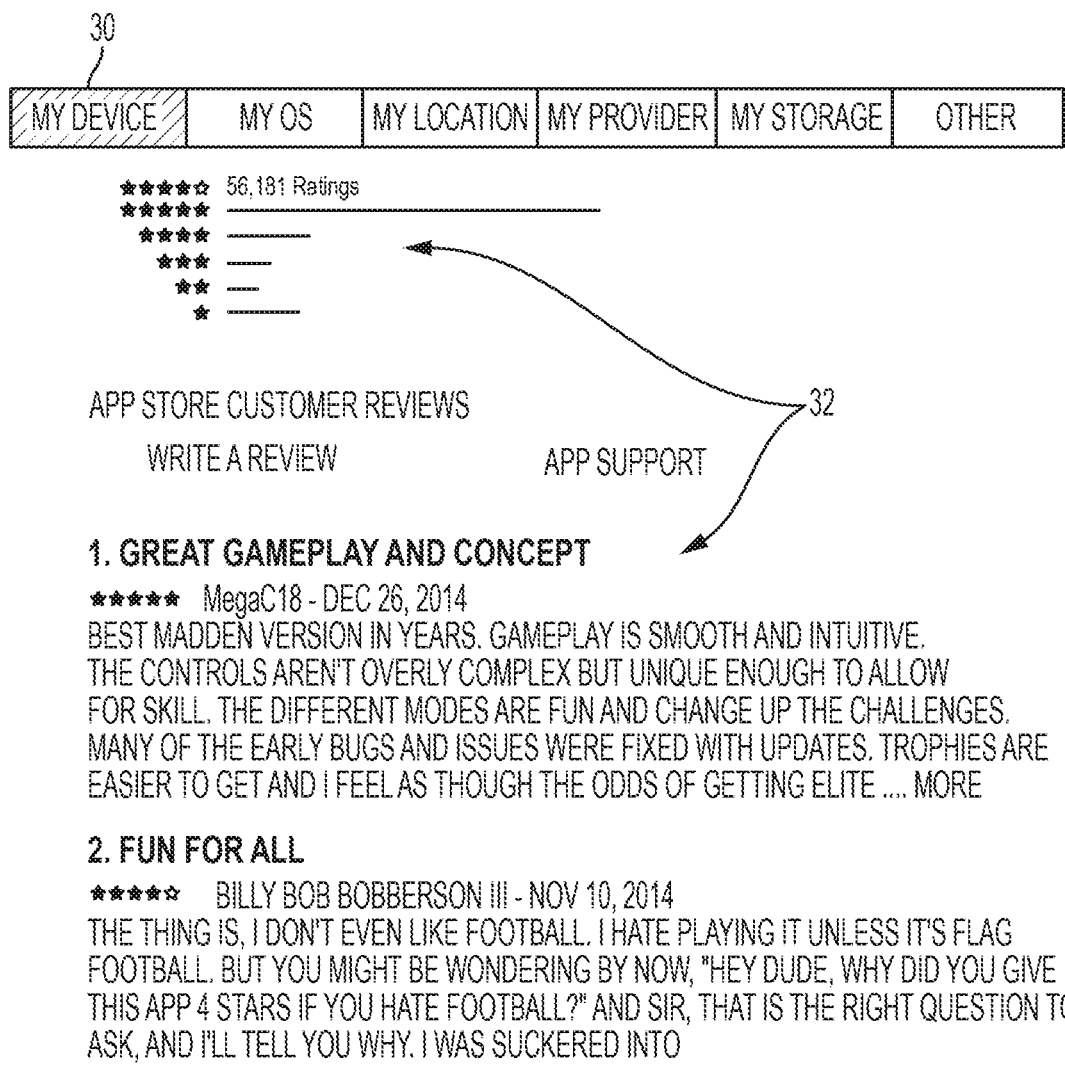
FIG. 2 is a schematic of filtering of application reviews according to an embodiment of the present invention.
Figure 3:
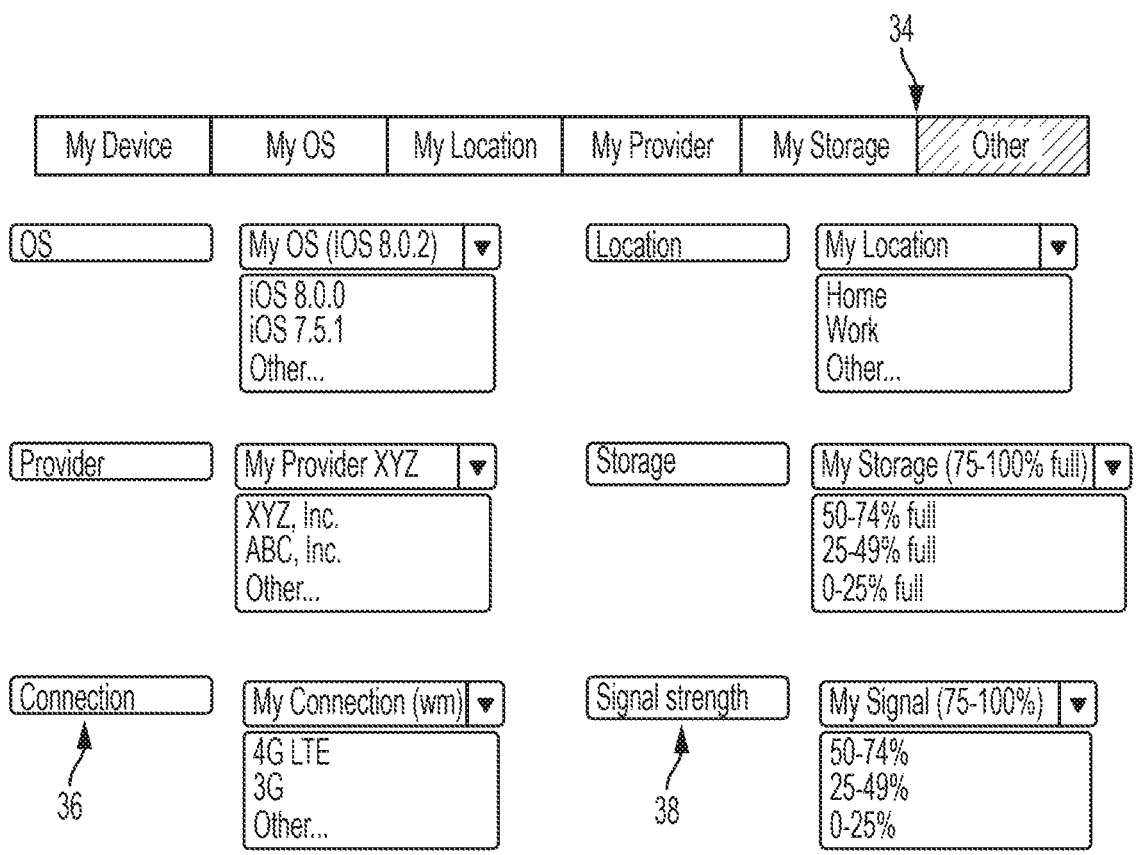
FIG. 3 is a schematic of user tailored filtering of application reviews according to an embodiment of the present invention.

Finally, the newly collected information is then used to present the potential user with a customized set of reviews according to the mobile device specific information of the potential user. This selection and arrangement of reviews can be provided in various ways. For example, in a first embodiment, the potential user may be provided with a menu of manual options for sorting the reviews using categories corresponding to the user specific information collected from users that provided reviews and by the potential user. More particularly, the potential user may be given the option to sort reviews according to whether the mobile devices of the reviewing users have matching specific information to that of the potential user sorting the reviews. For example, the reviews for a particular application can be filtered according to criteria such as "My Device" (reviewers who used the same mobile device as the potential user), "My OS" (reviewers who ran the same mobile operating system as the potential user), "My Location" (reviewers who were located in the same region as the potential user), "My Provider" (reviewers who used the same cellular provider as the potential user), "My Storage" (reviewers who had about the same amount of free storage space on their device as the potential user), "My Signal" (reviewers who had about the same amount of signal strength—Wifi or cellular—as the potential user), or combinations thereof. It should be recognized by those of skill in the art the additional categories of information may be used, and that the categories of information could be labelled with any term that easily identifies the nature of the sorting criteria to the potential user. As seen in FIG. 2, a user can select application reviews to match a particular attribute 30, illustrated as "My Device" to filter the reviews 32 to only those with matching attributes, e.g., reviews submitted using a mobile device that is the same as "My Device." As seen in FIG. 3, a custom filter option 34 may be provided to allow a user to filter using any desired combination of attributes, such as "Connection" 36 and Signal Strength" 38 together. Additional attributes can be considered through self-learning of a user over time, by learning the preferences of the user, and refining the application reviews presented to them.

In another embodiment, the user reviews can be automatically sorted using intelligent algorithms so that the potential user is presented with tailored insights as to the suitability of a given application to the particular set of circumstances of the potential user. These insights may be generated through comparative analysis utilizing rating analysis, sentiment analysis, and natural language processing. As an example, the criteria could be weighted depending on the nature of the application that is the subject of the reviews. Table 1 below identifies how the information collected according to the present invention can be intelligently weighted for automatic sorting and presentation to the potential user.

TABLE 1

| Criteria | Higher Significance Weight | Lower Significant Weight |
| --- | --- | --- |
| My Device | Graphics and CPU intensive apps such as a gaming application that is known to lag prior on older model chipsets or that requires features added to newer model phones. | Non graphic and CPU intensive apps, such as apps that are known to perform well on any device or apps that are not tied to features found only on newer mobile devices. |
| My OS | Apps that use functionality that is only offered by or limited to certain OS levels. | Apps where functionality is not tied to particular OS levels. |
| My Location | Location specific apps, such as restaurant couponing apps that are directed to regional chains or local establishments not found in all cities. | Apps where location is not a factor, such as games or navigation apps with worldwide capabilities. |
| My Storage | Apps that require a large amount of storage (for example <1 GB) may not be appealing to a user with limited storage. | Apps that require insignificant amount of storage equally appealing to mobile device users with highly or lowly utilized storage space. |

The appropriate weighting application to the criteria for a given application and a given user can be determined by first retrieving a statistically significant portion of or even all ratings and reviews for a given application where the reviewer matches at least one shared attributes of the user. Therefore all ratings and reviews where reviewers used the same device, same OS, same location, and so forth are retrieved. Next, a comparative analysis is performed to identify any common patterns with the ratings and reviews. This comparative analysis looks for commonalities that occur with a single shared attribute, and also that only occur when multiple shared attributes are combined. Confidence levels can also be assigned based upon the likelihood that an insight is relevant to a mobile device user. The comparative analysis may use techniques such as a rating analysis that analyzes the star ratings assigned to the application, a sentiment analysis that analyzes the sentiment expressed in written application reviews to determine positive or negative sentiment for given terms, and natural language processing that analyzes written comments in application reviews to best determine the reason for a rating.

The resulting insights based on any identified patterns may then be presented to the potential user. For example, the potential user may be presented with a summary analysis report such as that seen in FIG. 4. By clicking the "More Info" seen in FIG. 4, the application reviews that support these insights may be presented to the potential user for review. These application reviews thus represent a subset of the one or more shared attributes that would have been shown to the user in the first, manual embodiment. In this embodiment, the potential user is given insight into which shared attributes have been determined as being important for a given application and which are not.

One example of an insight that can be derived from the stored data is "70% of reviewers in your location and with your cellular provider were unhappy with the speed of this application." This insight may be determined by using a rating analysis to glean that application star ratings were 1.5 stars below a baseline or average when the reviews matched both My Location and My Provider. If no other single or combined shared attribute produces as big of a rating decline, it is possible to determine that reviews matching the My Location and My Provider attributes are important. Sentiment Analysis may then be used to determine the cause of the lower rating. For example, if a textual search of the reviews identified that the terms "performance" and "speed" had the highest negative sentiment associated with them and occurred in 70% of application reviews that matched My Location and My Provider, then the potential user can be provided with a message indicating that "70% of reviewers in your location and with your cellular provider were unhappy with the speed of this application."

Similarly, the insight "85% of reviewers with a similar amount of free storage rated the application 3 stars or less due to the large size of the app" may be derived by performing natural language processing to identify, through lemmatization, that many reviews referred to the size of the application, with comments such as bloated", "large install size", "too big", "not enough space," and similar derivatives, with these references clustered in reviews matching My Storage (75% or more of storage being used). Rating analysis may then be used to determine that star ratings for reviews were 3 stars or less in 85% of reviews matching My Storage.

Figure 5:
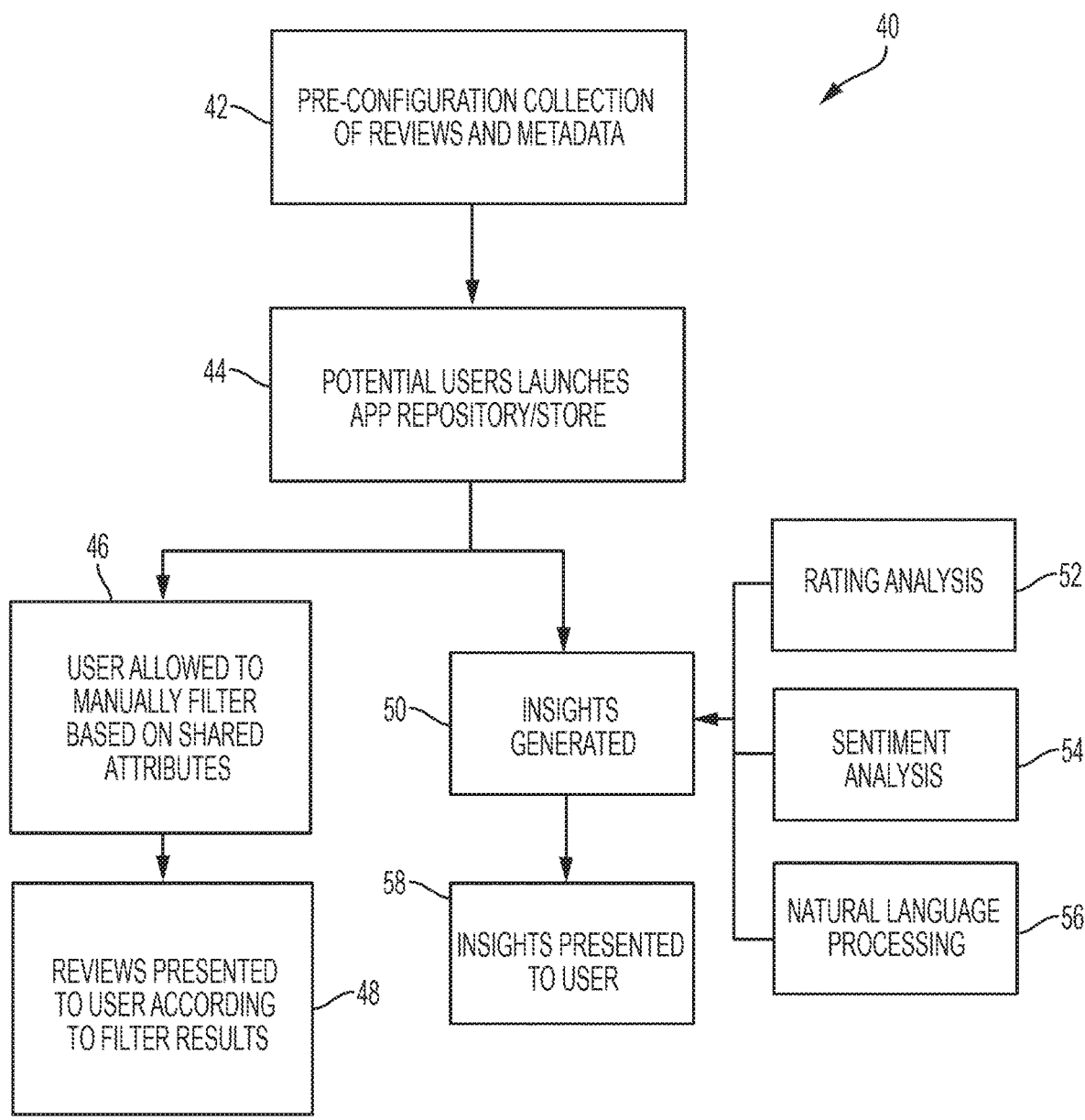
FIG. 5 is a flowchart of a process for filtering of application reviews according to an embodiment of the present invention.

Referring to FIG. 5, a process 40 for customizing mobile device application reviews according to the present invention begins with a pre-configuration collection 42 where users submit application store ratings and reviews, additional metadata is collected from the mobile device of the reviewing user and sent to the application store, such as device, OS, location, provider, storage, signal, connection as described above. Next, a potential user on mobile device launches an application store and views the reviews for a specific application 44.

In the manual embodiment of the present invention, all application reviews and ratings are made available to the user, who is then allowed to filter the application reviews 46 based on shared attributes using a graphical interface that provides filter criteria keyed to the shared attributes. For example, if the user selects the location criteria, the mobile device retrieves current geolocation using GPS and sends to application store, the application store receives the geolocation and compares to the geolocation stored for all reviews of the application, and only application reviews written within a defined area of that location (such as within 10 miles, within the same city, or within the same state or country) are returned to the mobile device for display 48 to the potential user. The potential user may then filter the application reviews based on additional attributes by repeating step 46.

In the intelligent embodiment of the present invention, insights are generated 50 when a user selects a given application by having the mobile device of the potential user send real time information about the mobile device along with the request for reviews. The application store then retrieves all reviews and ratings for the desired application that match the metadata from the mobile device and pass this information to the cognitive system. The cognitive system uses rating analysis 52, sentiment analysis 54, and natural language processing 56 to look for patterns in the subset of reviews and ratings. The cognitive system then combines the results to develop one or more insights for display to the potential user and confidence levels may be assigned based upon the likelihood that the insight is relevant to the potential user. The insights and collaborating application reviews from which the insights were generated are then sent from the cognitive system to the mobile device for display of the insights 58 along with the pertinent application reviews so that the potential user can view the specific reviews that contributed to the insights.

In a further embodiment of the invention, system 10 can provide recommendations on ideal operating conditions for a given mobile application, regardless of the mobile device user. For example, an analytics engine can retrieve all ratings and reviews for a given application, along with the associated attributes (mobile device, OS level, cellular provide, connection method, signal strength, available storage) for each review. The analytics engine then performs a comparative analysis to identify common patterns across all ratings regardless of any attribute matching using rating analysis, sentiment analysis, and natural language processing, as described above. The analytics engine develops insights based on identified patterns related to the combination of attributes where the mobile application runs optimally and the combination of attributes where the mobile application runs sub-optimally. As an example, the engine might determine the insight that Mobile App A runs best on mobile operating system iOS V7.1 and above, with the most common issues reported below this OS level were a lack of support for Feature X and frequent crashes. This insight could be determined by using Rating Analysis to determined that reviewers running less than iOS V7.1 gave the application a 50% lower than average star rating than users at iOS V7.1 or above, Sentiment Analysis to determined that the most commonly expressed negative sentiment for users below iOS V7.1 were related to performance, and natural language processing to determine that the most commonly expressed comments for those using below iOS V7.1 related to lack of Feature X. This embodiment of the present invention could be used by mobile application users considering purchasing an application to determine that they should upgrade to iOS V7.1 before using the application for the optimum experience. This embodiment of the present invention could also be used by mobile application developers to learn which attributes contribute most to positive and negative experiences with the application for the purposes of making adjustments to future versions of application accordingly.

Figure 6:
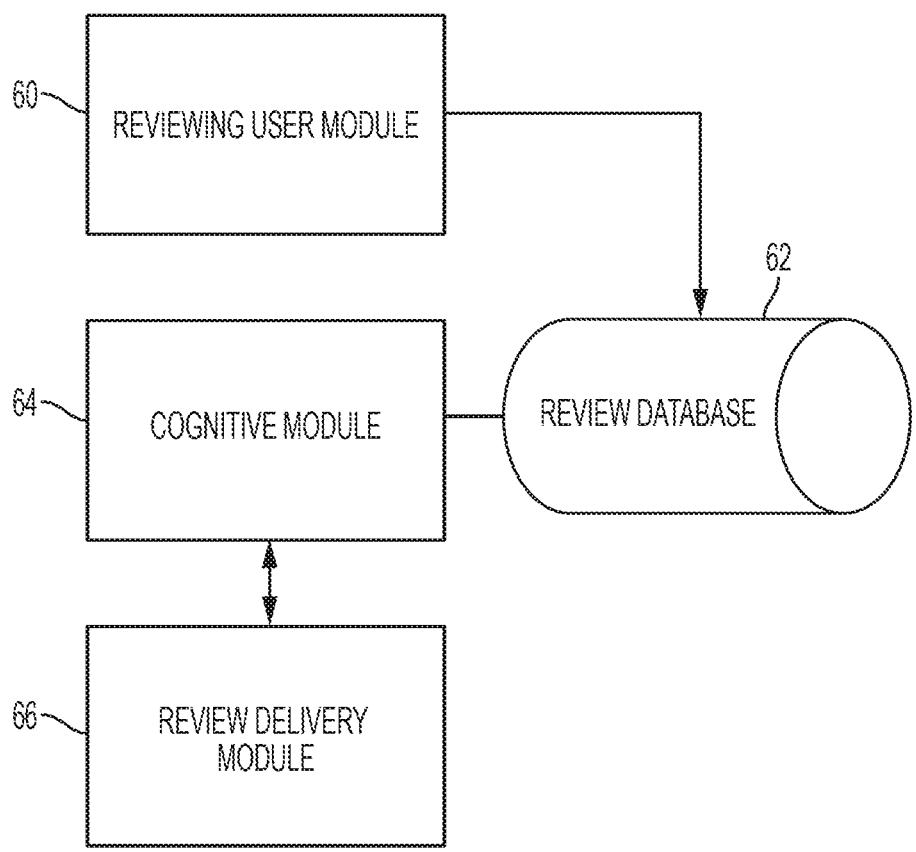
FIG. 6 is a block diagram of the components of a system for tailored mobile application rating insights according to the present invention.

Referring to FIG. 6, system 10 may implemented using a reviewing user module 60 that is programmed to collect app reviews 18 and reviewer attributes 24 for storage in an app review database 62. A cognitive module 64 is responsible for managing the app review database 62 and responding to potential user review requests that are received by review delivery module 66 along with requester attributes 26. Using requester attributes 26, cognitive module 64 can perform the customized review processes described above and identify relevant reviews for review delivery module 66 to provide to a user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a computer implemented process configured to customize mobile device application reviews, comprising the steps of:
   collecting a plurality of reviews relating to a mobile application from a corresponding plurality of mobile device application users via a plurality of mobile devices;
   collecting a first set of metadata associated with each of the plurality of mobile devices, wherein the first set of metadata includes at least two items selected from attributes consisting of mobile device type, mobile device operating system, location of the mobile device, mobile device service provider, mobile device storage capacity remaining, mobile device signal strength, and type of mobile connection, and associating the first set of metadata with each of the plurality of reviews;
   assigning a weight to each of the attributes in the first set of metadata based on a performance criteria of the mobile device application;
   collecting a second set of metadata associated with a potential user mobile device, wherein the second set of metadata includes at least two items selected from the attributes consisting of mobile device type, mobile device operating system, location of the potential user mobile device, mobile device service provider, mobile device storage capacity remaining, mobile device signal strength, and type of mobile connection;
   retrieving any reviews from the plurality of reviews that have at least one attribute in the first set of metadata that matches at least one attribute in the second set of metadata;
   presenting only reviews from the plurality of reviews that have at least one attribute in the first set of metadata that matches at least one attribute in the second set of metadata;
   wherein the order in which the reviews are presented is based on the weight assigned to the at least one attribute in the first set of metadata that matches at least one attribute in the second set of metadata;
   providing the potential user with a selectable list of attributes including at least one of mobile device type, mobile device operating system, location of the mobile device, mobile device service provider, mobile device storage capacity remaining, mobile device signal strength, and type of mobile connection;
   permitting the user to select which one or more attributes from the selectable list of attributes is used to filter the plurality of reviews; and
   filtering the reviews by retrieving only the reviews having the one or more attributes selected by the user from the selectable list of attributes.

2. The method of claim 1, further comprising the steps of:
   performing a comparative analysis that identifies any commonalities that occur among the reviews with matching attributes; and
   providing the potential user with an insight into the mobile device application that is based upon the comparative analysis.

3. The method of claim 2, wherein the step of performing a comparative analysis comprises the steps of analyzing any numerical rating associated with the reviews with matching attributes and analyzing the reviews with matching attributes to determine any positive or negative sentiment in the review.

4. The method of claim 3, wherein the step of performing a comparative analysis comprises the step of performing natural language processing of any written comments in the reviews with matching attributes to determine a reason the numerical rating is associated with the reviews.

5. A system for customizing mobile device application reviews, the system comprising:
   one or more computer processors;
   one or more computer readable storage media;
   program instructions stored on the one or more computer readable storage media for execution by at least one of the one or more computer processors, the program instructions executable to perform a method comprising:
   collecting a plurality of reviews relating to a mobile application from a corresponding plurality of mobile device application users via a plurality of mobile devices;
   collecting a first set of metadata associated with each of the plurality of mobile devices, wherein the first set of metadata includes at least two items selected from the attributes consisting of mobile device type, mobile device operating system, location, mobile device service provider, mobile device storage capacity remaining, mobile device signal strength, and type of mobile connection, and to associate the first set of metadata with each of the plurality of reviews;
   assigning a weight to each of the attributes in the first set of metadata based on a performance criteria of the mobile device application;
   collecting a second set of metadata associated with the potential user mobile device, wherein the second set of metadata includes at least two items selected from the attributes consisting of mobile device type, mobile device operating system, location, mobile device service provider, mobile device storage capacity remaining, mobile device signal strength, and type of mobile connection;
   retrieving any reviews from the plurality of reviews that have at least one attribute in the first set of metadata that matches at least one attribute in the second set of metadata;
   presenting only reviews from the plurality of reviews that have at least one attribute in the first set of metadata that matches at least one attribute in the second set of metadata;
   wherein the order in which the reviews are presented is based on the weight assigned to the at least one attribute in the first set of metadata that matches at least one attribute in the second set of metadata;

providing the potential user with a selectable list of attributes including at least one of mobile device type, mobile device operating system, location of the mobile device, mobile device service provider, mobile device storage capacity remaining, mobile device signal strength, and type of mobile connection;

permitting the user to select which one or more attributes from the selectable list of attributes is used to filter the plurality of reviews; and filtering the reviews by retrieving only the reviews having the one or more attributes selected by the user from the selectable list of attributes.

6. The system of claim 5, wherein the application repository is configured to perform a comparative analysis that identifies any commonalties that occur among the reviews with matching attributes, and to provide the mobile device of the potential user with an insight into the mobile device application that is based upon the comparative analysis.

7. The system of claim 6, wherein the application repository is configured to perform a comparative analysis by analyzing any numerical rating associated with the reviews with matching attributes and by analyzing the reviews with matching attributes to determine any positive or negative sentiment in the review.

8. The system of claim 6, wherein the application repository is configured to perform a comparative analysis by performing natural language processing of any written comments in the reviews with matching attributes to determine a reason the numerical rating is associated with the reviews.

9. The system of claim 6, wherein the cognitive system is configured to provide recommendations on ideal operating conditions for the mobile application regardless of the mobile device user.

10. The system of claim 9, wherein the cognitive system is configured to provide recommendations based on a comparative analysis to identify common patterns across the reviews regardless of any attribute matching using rating analysis, sentiment analysis, and natural language processing.

11. A computer program product for customizing mobile device application reviews, the computer program product encoded in a non-transitory computer readable storage medium comprising having program instructions embodied therewith, the program instructions executable by a processor to cause the processor to perform a method comprising:

collecting a plurality of reviews relating to a mobile application from a corresponding plurality of mobile device application users via a plurality of mobile devices;

collecting a first set of metadata associated with each of the plurality of mobile devices, wherein the first set of metadata includes at least two items selected from the attributes consisting of mobile device type, mobile device operating system, location of the mobile device, mobile device service provider, mobile device storage capacity remaining, mobile device signal strength, and type of mobile connection, and associating the first set of metadata with each of the plurality of reviews;

assigning a weight to each of the attributes in the first set of metadata based on a performance criteria of the mobile device application;

collecting a second set of metadata associated with the potential user mobile device, wherein the second set of metadata includes at least two items selected from the attributes consisting of mobile device type, mobile device operating system, location of the potential user mobile device, mobile device service provider, mobile device storage capacity remaining, mobile device signal strength, and type of mobile connection;

retrieving any reviews from the plurality of reviews that have at least one attribute in the first set of metadata that matches at least one attribute in the second set of metadata;

presenting only reviews from the plurality of reviews that have at least one attribute in the first set of metadata that matches at least one attribute in the second set of metadata;

wherein the order in which the reviews are presented is based on the weight assigned to the at least one attribute in the first set of metadata that matches at least one attribute in the second set of metadata;

providing the potential user with a selectable list of attributes including at least one of mobile device type, mobile device operating system, location of the mobile device, mobile device service provider, mobile device storage capacity remaining, mobile device signal strength, and type of mobile connection;

permitting the user to select which one or more attributes from the selectable list of attributes is used to filter the plurality of reviews; and filtering the reviews by retrieving only the reviews having the one or more attributes selected by the user from the selectable list of attributes.

12. The computer program product of claim 11, wherein the program instructions executable by the processor cause the processor to perform the step of performing a comparative analysis that identifies any commonalities that occur among the reviews with matching attributes and providing the potential user with an insight into the mobile device application that is based upon the comparative analysis.

13. The computer program product of claim 12, wherein the program instructions executable by the processor cause the processor to perform the step of performing a comparative analysis that comprises analyzing any numerical rating associated with the reviews with matching attributes and analyzing the reviews with matching attributes to determine any positive or negative sentiment in the review.

* * * * *